Oct. 7, 1958
A. H. LAMB ET AL
2,855,567
INSTRUMENT ADJUSTER ELEMENT
Filed April 16, 1954
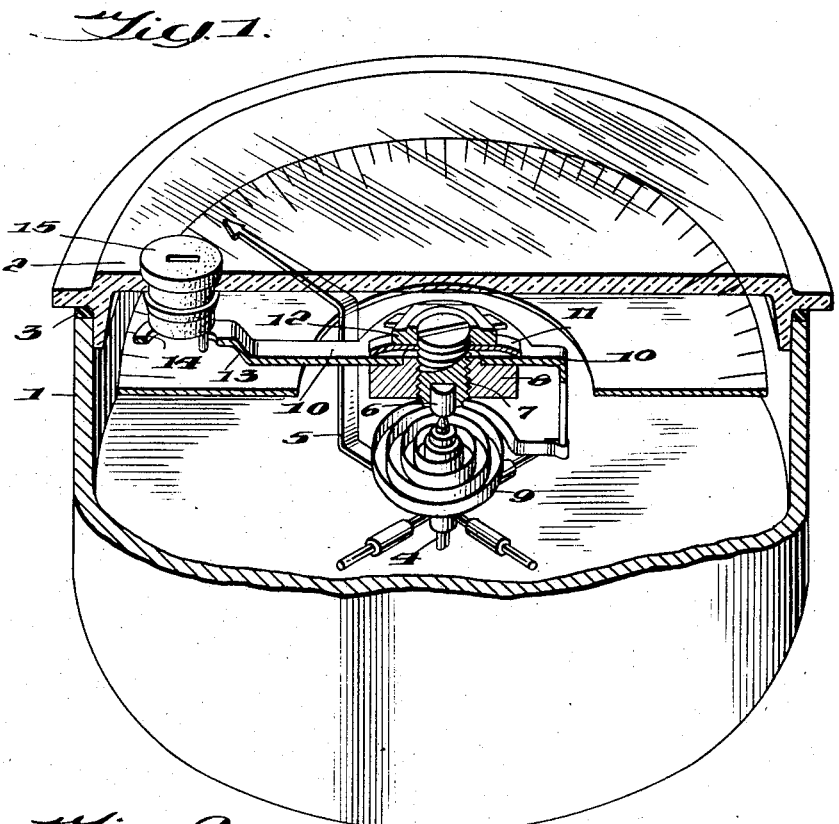
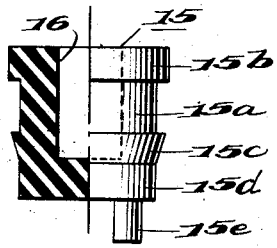
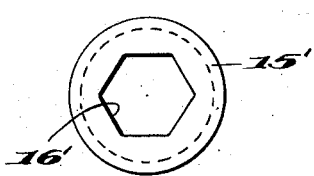
INVENTORS
ANTHONY H. LAMB,
ARTHUR D. CLARK,
BY Rudolph J Jurick
ATTORNEY

United States Patent Office 2,855,567
Patented Oct. 7, 1958

2,855,567

INSTRUMENT ADJUSTER ELEMENT

Anthony H. Lamb, Hillside, and Arthur D. Clark, Lake Hiawatha, N. J., assignors to Daystrom, Incorporated, Murray Hill, N. J., a corporation of New Jersey Application April 16, 1954, Serial No. 423,627

4 Claims. (Cl. 324—154)

This invention relates to an adjuster element for the zero corrector of an electrical measuring instrument and more particularly to a one-piece adjuster element of a pliable plastic material.

One end of the upper restoring spring of the moving system of electrical measuring instruments usually is anchored to a spring abutment having an arm provided with a yoke or an elongated slot for receiving the end of an adjuster element which extends through the top wall of the instrument casing. By manipulation of the adjuster element, the spring abutment may be turned angularly with respect to the axis of the moving system to vary the zero position of the instrument pointer. The entire assembly is termed the "zero corrector" of the instrument and, even in those instruments which are not housed in hermetically sealed cases, the adjuster element has usually included a number of parts assembled to extend through a counter-bored hole through the cover glass of the instrument case.

An object of the present invention is the provision of one-piece adjuster elements for the zero correctors of electrical measuring instruments, the adjuster elements being of a pliable plastic material and mounted in simple cylindrical bores through the glass or transparent plastic windows constituting at least a part of the top wall of the instrument case.

An object of this invention is the provision of one-piece pliable plastic adjuster elements for zero correctors, which include a cylindrical body for snugly fitting within a cylindrical bore formed in the instrument window, an enlarged head on the body portion for seating against the outer surface of the window, an enlarged flange or skirt for seating against the inner surface of the window, and an inner end portion shaped to lock mechanically with the spring abutment of the instrument zero corrector.

More specifically, it is an object of this invention to provide an adjuster element of the character stated in which the head and body portion of the plastic adjuster element are provided with a deep non-circular recess for receiving a tool for angular adjustment of the element, and in which the tool-receiving recess is in predetermined relation to the inner end portion of the element which is to interlock with the spring abutment.

These and other objects and advantages of the invention will be apparent from the following spcification when taken with the accompanying drawing. It will be understood that the drawings are for purposes of illustration and are not to be construed as defining the scope or spirit of the invention, reference being had for the latter purpose to the appended claims.

In the drawings wherein like reference characters denote like parts in the several views:

Figure 1 is a fragmentary perspective view of an instrument including a zero corrector provided with an adjusting element embodying the invention;

Figure 2 is an elevational view on a larger scale and partly in central section, of the adjusting element; and Figure 3 is a top plan view of another embodiment of the adjuster element.

In Fig. 1 of the drawing, the reference numeral 1 identifies the case of a cylindrical instrument to which the cover, here shown as a window 2 of glass or a transparent plastic, is secured by appropriate means, not shown. A resilient gasket 3 is preferably clamped or cemented between the cylindrical case 1 and the top wall 2 to provide a dust and/or moisture-proof seal. The moving system of the instrument includes a staff 4 which carries a pointer 5 and is supported in a jewel 6 carried by a bearing screw 7 which is threaded through a bridge 8. The inner end of a spiral restoring spring 9 is secured to the staff 4 in the usual manner. The outer end of the spring 9 is soldered or otherwise secured to the down-turned inner end of a spring abutment 10 which is resiliently clamped to the upper surface of the bridge 8 by a spring washer 11 and a nut 12 on the bearing screw 7. The spring abutment 10 includes a radial arm 13 having a slot 14 therein for receiving the projecting pin of an adjuster element which extends through the top wall of the instrument case and is rotatable to adjust the spring abutment angularly about the axis of the instrument moving system, thereby to determine the zero position of the pointer 5.

In accordance with the invention, the adjuster element 15 is a one-piece body of pliable plastic, such as natural or synthetic rubber, having a cylindrical body portion 15a, see Figure 2, for snugly fitting within a constant-diameter cylindrical hole extending through the top wall of the instrument case, an enlarged head 15b with a radially projecting lower surface for seating upon the outer surface of the top wall, an intermediate flange 15c with a radially extending upper surface for seating against the lower surface of the top wall, and a terminal section 15d with an integral, eccentrically-located pin 15e projecting therefrom to enter the slot 14 in arm 13 of the spring abutment 10 when the instrument is assembled in its case. The adjuster element is provided with a bore 16 of non-circular cross-section for receiving a tool for turning the element angularly to adjust the zero corrector.

As shown in Figures 1 and 2, the recess is of rectangular cross-section to receive the end of a screw driver and the eccentric pin 15e, for mechanical coupling with the spring abutment 10, is preferably located in a diametrical plane through the major axis of the recess 16, thereby showing from the outside the angular position of said pin. The recess extends axially into the plastic adjuster element from its top surface into substantial radial alinement with the top surface of the flange 15c to facilitate the deformation of this flange when inserting the adjuster element in or removing it from the top wall of the instrument case.

The terminal section 15d is of somewhat smaller diameter than the cylindrical body section 15a, and the device is mounted in the top wall by inserting the terminal section in the outer end of the cylindrical hole in the window element, and applying pressure to the head 15b. The enlarged flange 15c is deformed to pass through the cylindrical hole and goes completely through and beyond the top wall when the applied pressure is sufficient to bow the enlarged head 15b slightly inwardly. The bange 15c snaps back upon clearing the hole to fit snugly against the under surface of the top wall. The length of the body portion 15a is substantially equal to the thickness of the top wall, and the resiliency of the pliable plastic affords a seal which is not only dust tight but substantially moisture proof except when the pressure within the instrument case differs substantially from the outside air pressure. The body portion may be coated with a silicone grease to reduce frictional resistance to movement and to improve the moisture-tight characteristics of the construction.

As shown in Figure 3, a plastic adjuster element 15' may be provided with a bore 16' to receive tools of any desired non-circular cross-section such as, for example, an Allen wrench.

Having now given a detailed description of our invention in accordance with the patent statutes what we desire to protect by Letters Patent of the United States is recited in the following claims.

We claim:

1. An adjuster element for rotatable mounting in a cylindrical hole through the upper wall of an instrument case housing an electrical instrument including a zero corrector comprising an angularly adjustable spring abutment; said adjuster element consisting of a one-piece body of pliable plastic having a cylindrical portion for snugly fitting said cylindrical hole, an enlarged head on said cylindrical portion with the lower surface extending radially from said cylindrical portion to seat against the outer surface of said upper wall, an enlarged flange having an upper surface projecting radially from said body portion to seat against the lower surface of said upper wall, said flange being deformable inwardly by pressure applied to the head of said element to pass through said cylindrical bore, and means at the inner end of said element adapted for mechanical coupling with said adjustable spring abutment.

2. An adjuster element as recited in claim 1, wherein the head and cylindrical body are provided with a non-circular tool-receiving recess, said recess extending inwardly substantially into radial alinement with the upper portion of said enlarged flange, thereby to facilitate deformation of said flange to pass through the cylindrical hole in the upper wall of the instrument case.

3. An adjuster element as recited in claim 2, wherein said tool-receiving recess is of rectangular cross-section to receive the end of a screw-driver, and said coupling means at the inner end of said element is a cylindrical pin offset from the axis of the adjuster element.

4. An adjuster element as recited in claim 2, wherein the tool-receiving recess is of diametrically elongated cross section and the means adaped for mechanical coupling with the adjustable spring abutment lies in the diametral plane through the major axis of said recess, whereby the angular position of said means is apparent from the outside.

References Cited in the file of this patent

UNITED STATES PATENTS

| | | |
|---|---|---|
| 204,913 | Pratt | June 18, 1878 |
| 2,095,931 | Kraft | Oct. 12, 1937 |
| 2,440,392 | Butler | Apr. 27, 1948 |
| 2,493,060 | Daschke | Jan. 3, 1950 |
| 2,585,438 | Clingman | Feb. 12, 1952 |
| 2,698,557 | Harper | Jan. 4, 1955 |